United States Patent
Mabe et al.

(10) Patent No.: US 11,493,093 B2
(45) Date of Patent: Nov. 8, 2022

(54) POWER TRANSMISSION SHAFT

(71) Applicant: HITACHI AUTOMOTIVE SYSTEMS, LTD., Hitachinaka (JP)

(72) Inventors: Yasutomo Mabe, Akiruno (JP); Toshiyuki Masuda, Atsugi (JP); Hiromichi Komai, Hadano (JP); Kenichiro Ishikura, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 362 days.

(21) Appl. No.: 16/634,254

(22) PCT Filed: Aug. 28, 2018

(86) PCT No.: PCT/JP2018/031644
§ 371 (c)(1),
(2) Date: Jan. 27, 2020

(87) PCT Pub. No.: WO2019/054167
PCT Pub. Date: Mar. 21, 2019

(65) Prior Publication Data
US 2020/0370603 A1 Nov. 26, 2020

(30) Foreign Application Priority Data
Sep. 15, 2017 (JP) .............................. JP2017-177231

(51) Int. Cl.
*F16D 3/24* (2006.01)
*B60K 17/24* (2006.01)
(Continued)

(52) U.S. Cl.
CPC ................ *F16D 3/24* (2013.01); *B60K 17/24* (2013.01); *F16C 3/023* (2013.01); *F16C 3/026* (2013.01);
(Continued)

(58) Field of Classification Search
CPC ..... F16D 3/24; F16D 3/06; F16D 3/32; F16D 3/12; F16D 2003/22323; F16D 2001/103;
(Continued)

(56) References Cited

U.S. PATENT DOCUMENTS 7,074,129 B2    7/2006  Sugiyama
7,438,612 B2 *  10/2008 Wada ...................... F16F 15/10
                                                         464/180

(Continued)

FOREIGN PATENT DOCUMENTS

DE    11 2014 001 114 T5    12/2015
JP         2000-329130 A    11/2000
(Continued)

OTHER PUBLICATIONS

International Search Report with English translation issued in corresponding application No. PCT/JP2018/031644 dated Nov. 27, 2018.

(Continued)

*Primary Examiner* — Greg Binda
(74) *Attorney, Agent, or Firm* — Foley & Lardner LLP

(57) ABSTRACT

A propeller shaft as a power transmission shaft is provided between vehicle-side first second shaft parts, and a first tube as a first shaft member is connected to the first shaft part through a first joint member and to the second shaft part through a second joint member. The first tube is connected to the first joint member through a first collar member and to the second joint member through a second collar member. The first collar member includes a first main body part exposed from a first end portion of the first tube, and a first insertion part inserted into the inside of the first end portion. In at least the first collar member, the maximum value of the
(Continued)

outer diameter of the first main body part is set to be no greater than the maximum value of the outer diameter of the first insertion part.

13 Claims, 8 Drawing Sheets

(51) Int. Cl.
*F16C 3/02* (2006.01)
*F16D 3/06* (2006.01)
*F16D 3/32* (2006.01)
*F16D 3/12* (2006.01)
*F16D 3/223* (2011.01)

(52) U.S. Cl.
CPC ............... *F16D 3/06* (2013.01); *F16D 3/32* (2013.01); *F16C 2204/00* (2013.01); *F16C 2208/02* (2013.01); *F16C 2326/06* (2013.01); *F16D 3/12* (2013.01); *F16D 2003/22323* (2013.01); *Y10S 464/906* (2013.01)

(58) Field of Classification Search
CPC ....... F16D 1/0858; B60K 17/24; B60K 17/22; F16C 3/023; F16C 3/026; F16C 2204/00; F16C 2208/02; F16C 2326/06; Y10S 464/906; B60Y 2306/01; F16F 7/125

USPC .................................................. 464/180–182
See application file for complete search history.

(56) References Cited

U.S. PATENT DOCUMENTS

| | | | |
|---|---|---|---|
| 7,442,127 B2* | 10/2008 | Kai | .......................... F16C 3/026 464/181 |
| 2006/0040753 A1 | 2/2006 | Kai | |
| 2016/0017929 A1 | 1/2016 | Sugiyama et al. | |

FOREIGN PATENT DOCUMENTS

| | | |
|---|---|---|
| JP | 2000-337343 A | 12/2000 |
| JP | 2003-184854 A | 7/2003 |
| JP | 2004-293718 A | 10/2004 |
| JP | 2006-56389 A | 3/2006 |
| JP | 4053346 B2 | 2/2008 |
| JP | 2016-172508 A | 9/2016 |

OTHER PUBLICATIONS

Written Opinion with English translation issued in corresponding application No. PCT/JP2018/031644 dated Nov. 27, 2018.

* cited by examiner

POWER TRANSMISSION SHAFT

TECHNICAL FIELD

The present invention relates to a power transmission shaft.

BACKGROUND TECHNOLOGY

As an conventional power transmission shaft, for example, one which is described, in the following patent document 1 has been known.

This power transmission shaft is a so-called propeller shaft to be applied to a vehicle, and a first shaft part connected to a transmission of the vehicle and a second shaft part connected to a differential device of the vehicle are connected to each other so as to be relatively movable in the axial direction, through a so-called collapse mechanism configured by spline fitting. In this collapse mechanism, first and second collar members disposed to respective both end portions of a cylindrical first shaft member formed to have inner and outer layers with a fiber reinforced resin enters into the inner peripheral side of the first shaft member while peeling the inner peripheral layer by the flange portions of the respective first and second collar members, and thereby a collision energy of the vehicle is absorbed.

PRIOR ART DOCUMENT

Patent Document

Patent Document 1: Japanese Patent 4053346

SUMMARY OF THE INVENTION

Problem to be Solved by the Invention

However, in the conventional propeller shaft, the flange portions are provided to both of the respective first and second collar members. Consequently, there is a problem that, at the time of the collision of the vehicle, in the both end sides of the first shaft member, each of the first and second collar members cannot smoothly enter into the inside of the first shaft member due to the sticking of the first and second collar members by the flange portions, and a sufficient stroke amount of each of the collar members cannot be secured.

Therefore, the present invention is one thought out in view of the technical problem of the conventional propeller shaft, and an object of the present invention is to provide a power transmission shaft in which a sufficient stroke amount of each of first and second collar members with respect to a first shaft member can be secured.

Means for Solving the Problem

In the present invention, as one aspect thereof, the maximum value of the outer diameter of a first main body part of a first collar member is set to be equal to or less than the maximum value of the outer diameter of a first insertion part.

Effect of the Invention

According to the present invention, a sufficient stroke amount of each of the first and second collar members with respect to the first shaft member can be secured.

MODE FOR IMPLEMENTING THE INVENTION

In the following, embodiments of a power transmission shaft according to the present invention will be explained in detail, based on the drawings. In addition, in the following embodiments, the power transmission shaft will be explained as one which is applied, in the same way as the prior art, to a propeller shaft for a vehicle, as an example.

First Embodiment

Figure 1:
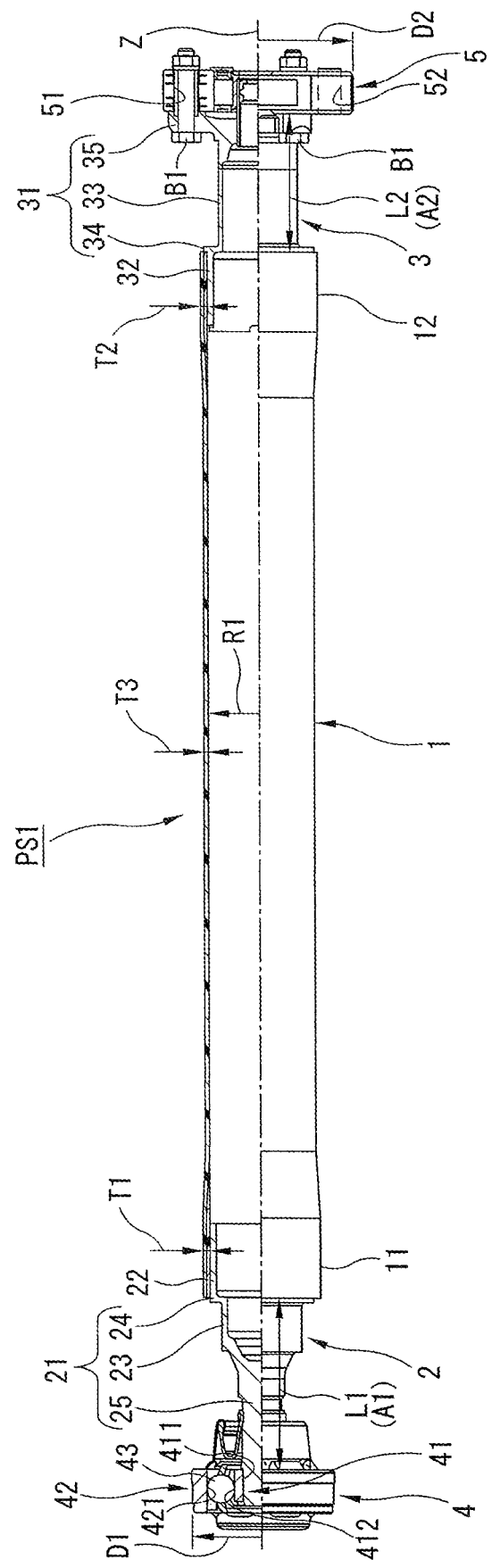
FIG. 1 is a semi-longitudinal section view showing the whole of a power transmission shaft according to a first embodiment of the present invention.

FIG. 1 to FIG. 5 show a first embodiment of a power transmission shaft according to the present invention. In addition, in the explanation for the embodiment, for convenience, the left side in FIG. 1 is referred to as "front", the right side in FIG. 1 is referred to as "rear". Moreover, in the explanation, the direction along a rotation axis Z in FIG. 1 is referred to as "axial direction", the direction orthogonal to the rotation axis Z is referred to as "radial direction", and the direction around the rotation axis Z is referred to as "circumferential direction".

Configuration of Propeller Shaft

FIG. 1 is a side view of a propeller shaft PS1, showing the whole form of the propeller shaft PS1 according to a first embodiment of the present invention.

As shown in FIG. 1, the propeller shaft PS1 is disposed between a pair of vehicle-side rotation shaft parts of a first shaft part which is not shown in the drawings and which is disposed on the front side of a vehicle and a second shaft part which is not shown in the drawings and which is disposed on the rear side of the vehicle. Here, the first shaft part corresponds to the output shaft of a transmission disposed on the front side of the vehicle, and the second shaft part corresponds to the input shaft of a differential device disposed on the rear side of the vehicle.

The propeller shaft PS1 according to the embodiment is a propeller shaft having a so-called one-piece structure. The front end side of the propeller shaft PS1 is connected to the first shaft part, which is not shown in the drawings, through a first joint member 4, and the rear end side thereof is connected to the second shaft part, which is not shown in the drawings, through a second joint member 5. That is, the propeller shaft PS1 includes a cylindrical first tube 1 corresponding to a first shaft member, a first collar member 2 inserted into a first end portion 11 that is the front end part of the first tube 1, and a second collar member 3 inserted into a second end portion 12 that is the rear end part of the first tube 1.

The first tube 1 is made of a carbon fiber reinforced plastic material (so-called CFRP), and is formed in a cylindrical shape having a fixed inner diameter R1 in the axial direction. In addition, in the first tube 1, a thickness T1 of the first end portion 11 and a thickness T2 of the second end portion 12 each are thicker than a thickness T3 of a general part.

The first collar member 2 includes a first main body part 21 exposed from the first end portion 11 of the first tube 1 and connected to the first joint member 4, and a first insertion part 22 axially extending from the rear end portion of the first main body part 21 and inserted to the inside of the first end portion 11 of the first tube 1. The first main body part 21 includes a first base portion 23, a first insertion-side connection portion 24 of which the diameter is enlarged stepwisely from the rear end portion of the first base portion 23 and which is connected to the first insertion part 22, and a first joint-side connection portion 25 of which the diameter is reduced stepwisely from the front end portion of the first base portion 23 and which is connected to the first joint member 4. The first insertion part 22 is integrally rotatably fixed to the first tube 1 by the after-mentioned serration coupling. In addition, the first collar member 2 is formed such that, in the axial direction, a distance L1 between the first end portion 11 of the first tube 1 and the first joint member 4 in the axial direction is longer than a distance L2 between the second end portion 12 and the second joint member 5.

The second collar member 3 includes a second main body part 31 exposed from the second end portion 12 of the first tube 1 and connected to the second joint member 5, and a second insertion part 32 axially extending from the front end portion of the second main body part 31 and inserted into the inside of the second end portion 12 of the first tube 1. The second main body part 31 includes a second base portion 33, a second insertion-side connection portion 34 of which the diameter is enlarged stepwisely from the front end portion of the second base portion 33 and which is connected to the second insertion part 32, and a second joint-side connection portion 35 of which the diameter is enlarged stepwisely from the rear end portion of the second base portion 33 and which is connected to the second joint member 5. The second insertion part 32 is integrally rotatably fixed to the first tube 1 by the after-mentioned serration coupling.

The first joint member 4 is a so-called constant velocity universal joint, and is provided on the opposite side in the axial direction of the first tube 1 to the first collar member 2. That is, this first joint member 4 includes a cylindrical inner ring member 41 fixed to the outer peripheral surface of the first joint-side connection portion 25, a cylindrical outer ring member 42 disposed facing the outer peripheral surface of the inner ring member 41, and a plurality of balls 43 as rolling elements which are rollably disposed between the outer ring member 42 and the inner ring member 41. Then, the first joint member 4 is formed such that an outer diameter D1 of the outer ring member 42 which corresponds to the maximum value of the outer diameter thereof is greater than the maximum value of the outer diameter of the first insertion part 22.

A shaft through hole 411 through which the first joint-side connection portion 25 passes penetrates through the inner peripheral side of the inner ring member 41 along the axial direction. That is, the first joint-side connection portion 25 passes through the shaft through hole 411 such that the first joint-side connection portion 25 and the inner ring member 41 are integrally rotatably fixed to each other. In addition, inner ring-side axial grooves 412 in which the respective balls 43 can roll are formed along the axial direction on the outer peripheral side of the inner ring member 41. That is, the balls 43 are engaged with both the inner ring-side axial grooves 412 and the after-mentioned outer ring-side axial grooves 421, and consequently, the relative movement in the circumferential direction of the inner ring member 41 and the outer ring member 42 is regulated, while allowing the relative movement in the axial direction of the inner ring member 41 and the outer ring member 42 by the rolling of the balls between the inner ring-side axial grooves 412 and the outer ring-side axial grooves 421.

The outer ring member 42 is integrally rotatably fixed to the first shaft part, which is not shown in the drawings, through a plurality of bolts which are not shown in the drawings. In addition, the outer ring-side axial grooves 421 in which the respective balls 43 can roll are formed along the axial direction on the inner peripheral side of the outer ring member 42. That is, the balls 43 are engaged with both the inner ring-side axial grooves 412 and the outer ring-side axial grooves 421, and consequently, the relative movement in the circumferential direction of the inner ring member 41 and the outer ring member 42 is regulated, while allowing the relative movement in the axial direction of the outer ring member 42 and the inner ring member 41 by the rolling of the balls between the outer ring-side axial grooves 421 and the inner ring-side axial grooves 412.

According to the above configuration, by integrally rotating the first shaft part, which is not shown in the drawings, with the outer ring member 42, the rotation torque output from the first shaft part is transmitted from the outer ring member 42 to the inner ring member 41 through the balls 43. Then, based on the transmitted rotation torque, the inner ring member 41 is rotated integrally with the first collar member 2 (first main body part 21).

The second joint member 5 is a so-called rubber joint, and is provided on the opposite side in the axial direction of the first tube 1 to the second collar member 3. That is, this second joint member 5 includes three first bolt through holes 51 for the connection with the second joint-side connection portion 35 which have substantially annular shapes and are circumferentially arranged at equal intervals, and includes three second bolt through holes 52 for the connection with the second shaft part, which is not shown in the drawings, which are arranged between the first bolt through holes 51 at equal intervals in the circumferential direction. That is, the second joint-side connection portion 35 formed in a three-pronged fork shape is connected with the second joint member 5 through first bolts B1 passing through the respective first bolt through holes 51, thereby being integrally rotatably fixed. On the other hand, the second shaft part formed in a three-pronged fork shape, which is not shown in the drawings, is connected with the second joint member 5 through second bolts which are not shown in the drawings and which pass through the respective second bolt through holes 52, thereby being integrally rotatably fixed. In addition, the second joint member 5 is formed such that an outer diameter D2 of the second joint member 5 which corresponds to the maximum value of the outer diameter thereof is greater than the maximum value of the outer diameter of the second insertion part 32.

Figure 2:
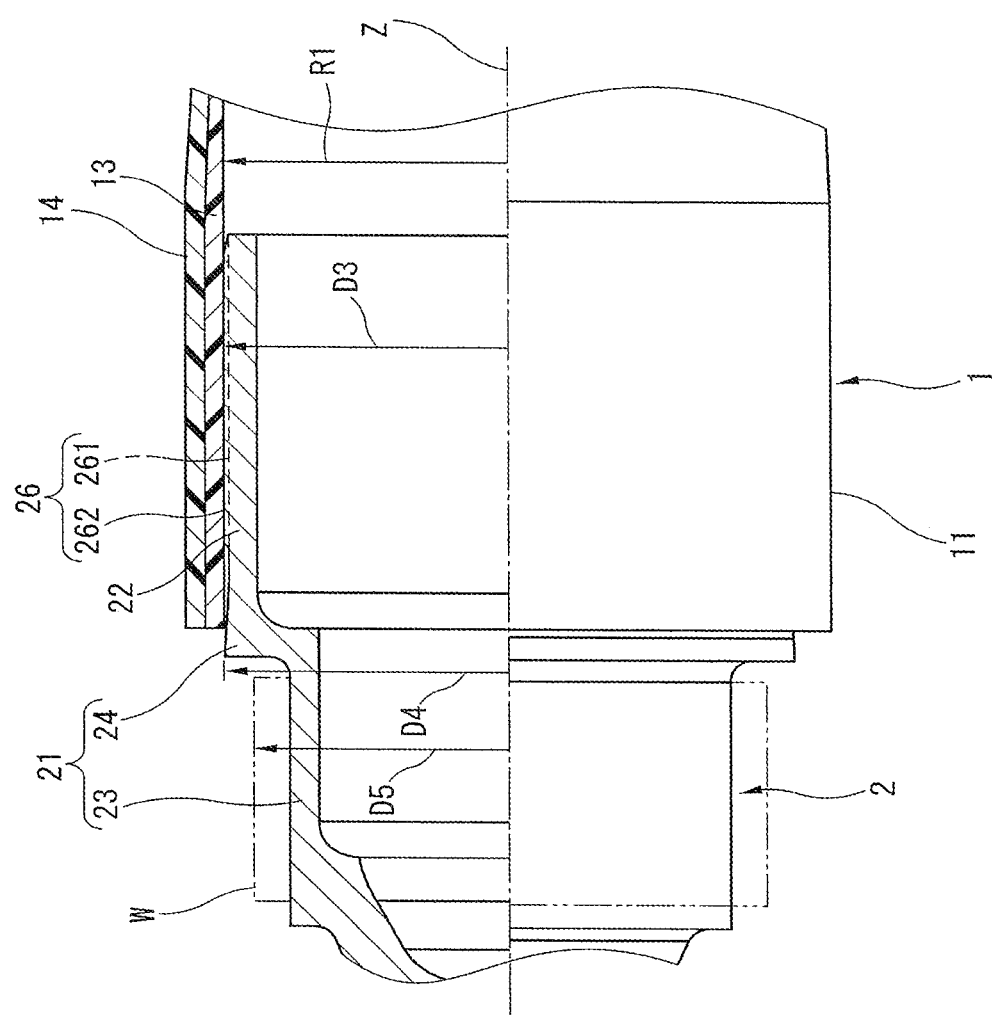
FIG. 2 is a semi-longitudinal section view of the power transmission shaft, showing an enlarged part in the vicinity of a first end portion of a first shaft member shown in FIG. 1.

FIG. 2 shows an enlarged main part view of FIG. 1 that is a view shown by enlarging a part in the vicinity of the first end portion 11 of the first tube 1 shown in FIG. 1.

The first tube 1 is integrally formed by laminating a carbon fiber reinforced plastic material (so-called CFRP) in the radial direction, and is formed of at least inner and outer layers having an inner peripheral layer 13 and an outer peripheral layer 14.

A first serration portion 26 which is coupled to the first tube 1 by serration coupling is formed on the outer peripheral side of the first insertion part 22 along the axial direction. The first serration portion 26 is formed such that a groove 261 extends in the direction parallel to the rotation axis Z, and an outer diameter D3 of tooth tips 262 is set to be slightly greater than an inner diameter R1 of the first tube 1. That is, the tooth tips 262 bite into the inner peripheral surface of the first tube 1 in a state in which the first insertion part 22 has been inserted into the inside of the first tube 1, and the first insertion part 22 and the first tube 1 are integrally rotatably engaged by the first serration portion 26.

An outer diameter D4 of the first insertion-side connection portion 24 is set so as to be the maximum value of the outer diameter of the first main body part 21. That is, in a region A1 (see FIG. 1) having a predetermined length from the first end portion 11 of the first tube 1 toward the opposite side of the first insertion part 22 (specifically, the maximum axial region of the first main body part 21 which enters into the inside of the first tube 1), the maximum value of the outer diameter of the first main body part 21 is set so as to be equal to or less than the maximum value of the outer diameter of the first insertion part 22 which corresponds to the outer diameter D3 of the tooth tips 262 of the first serration portion 26.

The first base portion 23 has a fixed outer diameter in the axial direction, and the outer peripheral surface of the first base portion 23 is formed to be flat. In addition, a balance weight W having a predetermined weight for adjusting the rotation balance of the propeller shaft PS1 is attached to the outer peripheral surface of the first base portion 23. Here, the first base portion 23 is formed such that an outer diameter D5 in a state in which the balance weight W has been attached is smaller than the outer diameter D4 of the first insertion-side connection portion 24. In other words, the first base portion 23 is formed such that the maximum value of the outer diameter of the first collar member 2 including the balance weight W (in the present embodiment, the diameter D4 of the first insertion-side connection portion 24) is smaller than the inner diameter R1 of the first tube 1.

Figure 3:
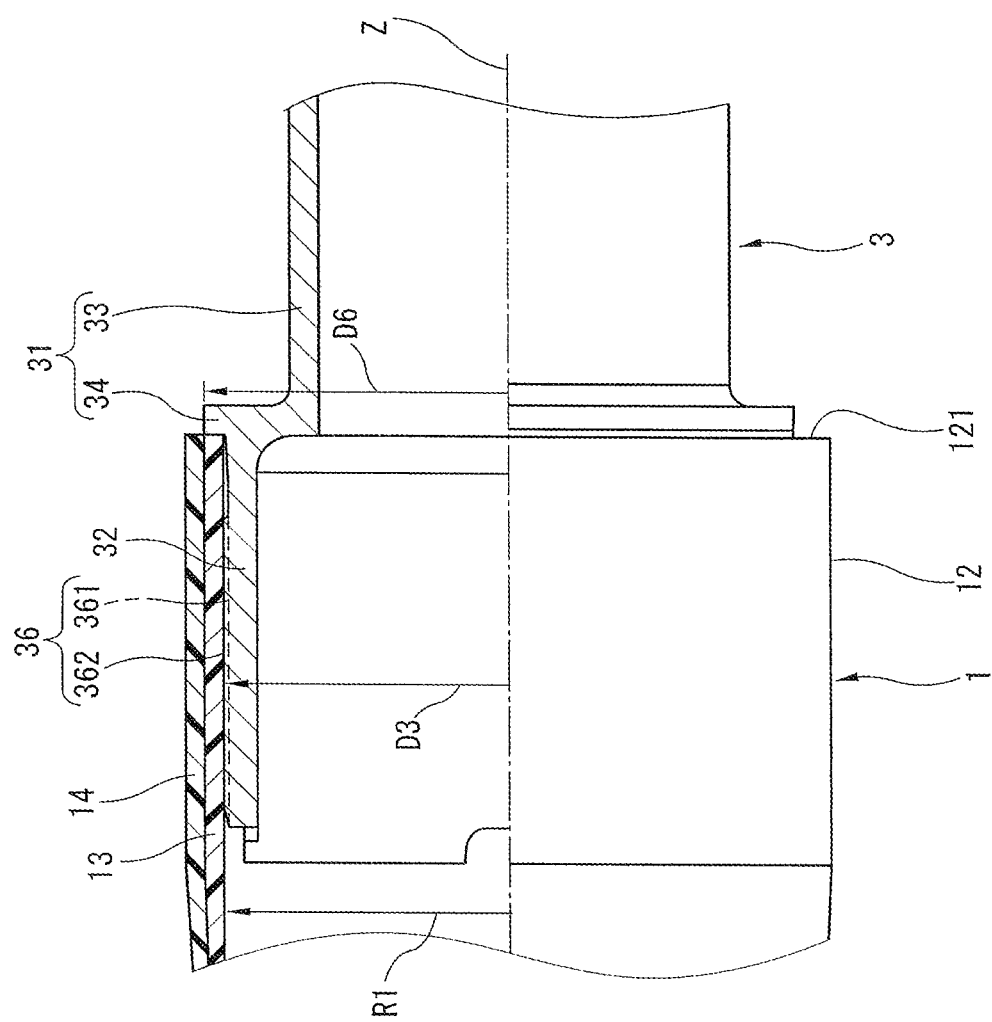
FIG. 3 is a semi-longitudinal section view of the power transmission shaft, showing an enlarged part in the vicinity of a second end portion of the first shaft member shown in FIG. 1.

FIG. 3 shows an enlarged main part view of FIG. 1 that is a view shown by enlarging a part in the vicinity of the second end portion 12 of the first tube 1 shown in FIG. 1.

A second serration portion 36 which is coupled to the first tube 1 by serration coupling is formed on the outer peripheral side of the second insertion part 32 along the axial direction. The second serration portion 36 is formed such that a groove 361 extends in the direction parallel to the rotation axis Z, and an outer diameter D3 of tooth tips 362 is set to be slightly greater than the inner diameter R1 of the first tube 1. That is, the tooth tips 362 bite into the inner peripheral surface of the first tube 1 in a state in which the second insertion part 32 has been inserted into the inside of the first tube 1, and the second insertion part 32 and the first tube 1 are integrally rotatably engaged by the second serration portion 36.

The second insertion-side connection portion 34 is formed as a flange portion such that an outer diameter D6 of the second insertion-side connection portion 34 is set to be the maximum value of the outer diameter of the second main body part 31. That is, in a region A2 (see FIG. 1) having a predetermined length from the second end portion 12 of the first tube 1 toward the opposite side of the second insertion part 32 (specifically the maximum axial region of the second main body part 31 which enters into the inside of the first tube 1), the maximum value of the outer diameter of the second main body part 31 is set so as to be greater than the maximum value of the outer diameter of the second insertion part 32 which corresponds to the outer diameter D3 of the tooth tips 362 of the second serration portion 36. In other words, the second insertion-side connection portion 34 overlaps with a second end surface 121 in the radial direction that is the end surface of the second end portion 12 of the first tube 1, and is formed so as to face the second end surface 121.

Collapse Structure of Propeller Shaft

Figure 4:
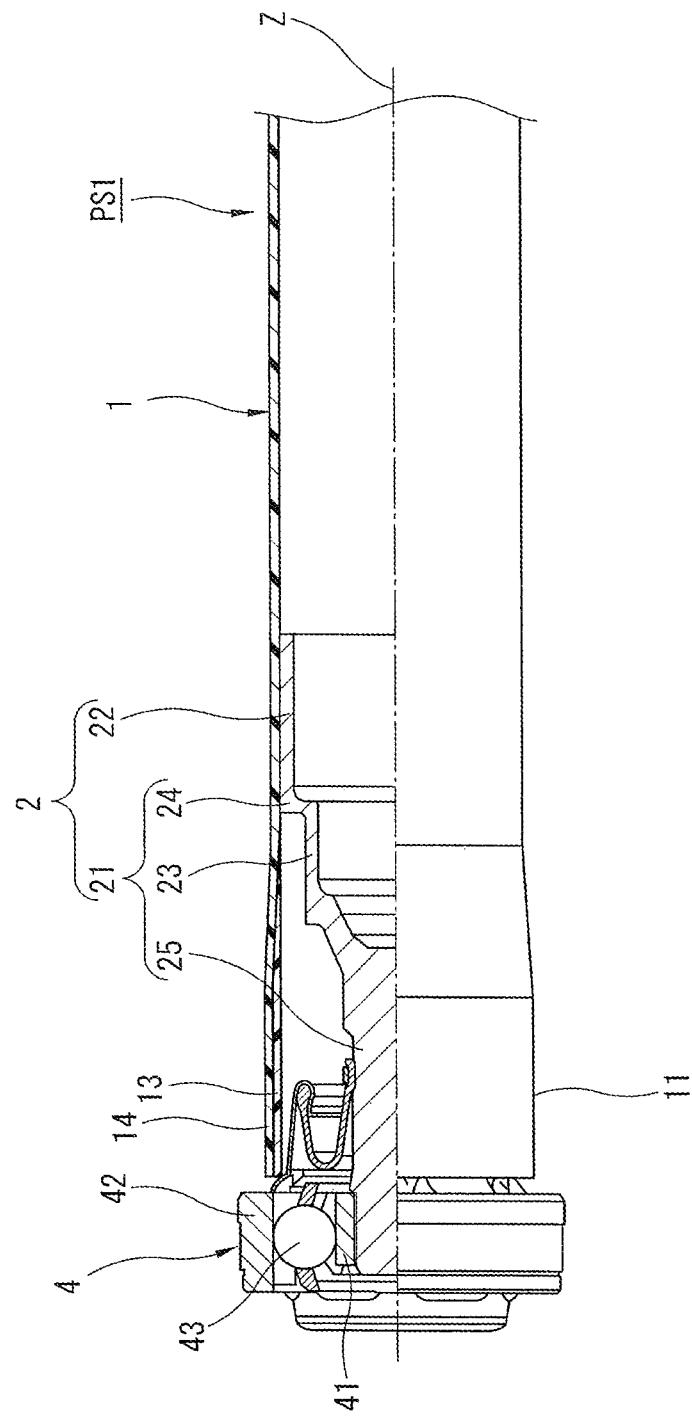
FIG. 4 is a semi-longitudinal section view of the power transmission shaft, showing a state in which an axial load is applied to a first collar member shown in FIG. 2.
Figure 5:
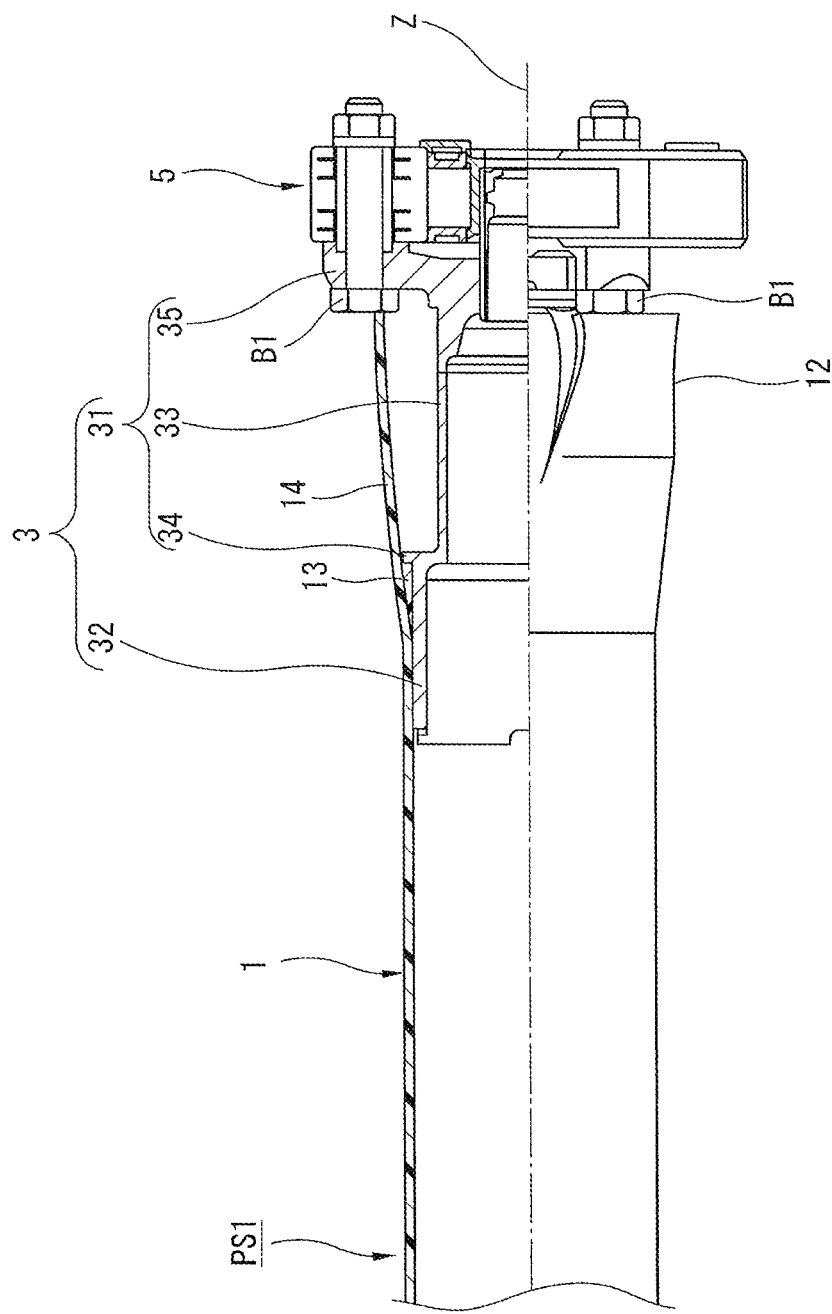
FIG. 5 is a semi-longitudinal section view of the power transmission shaft, showing a state in which an axial load is applied to a second collar member shown in FIG. 3.

FIG. 4 is a semi-longitudinal section view of the propeller shaft PS1, showing a state in which an axial load is applied to the first collar member 2 shown in FIG. 2. FIG. 5 is a semi-longitudinal section view of the propeller shaft PS1, showing a state in which an axial load is applied to the second collar member 3 shown in FIG. 3.

As an example, a case where an axial load in a compression direction is applied from the front end side of the propeller shaft PS1 due to the collision of a vehicle from the front side thereof will be explained. In this case, first, the axial load is transmitted from the first shaft part, which is not shown in the drawings, to the first collar member 2 through the first joint member 4. Then, as shown in FIG. 4, the first main body part 21 of the first collar member 2 receiving the axial load enters into the inside of the first end portion 11 of the first tube 1, and moves to the rear side (first tube 1 side) until the first joint member 4 comes in contact with the first end portion 11 of the first tube 1.

At this time, the first main body part 21 of which the maximum value of the outer diameter is set to be smaller than the maximum value of the outer diameter of the first insertion part 22 smoothly enters into the inside of the first tube 1 without interference with the first end portion 11 of the first tube 1. In other words, by the smooth entering of the first main body part 21 into the inside of the first tube 1, the axial load received by the first collar member 2 is smoothly transmitted to the rear side (second collar member 3 side).

Next, when the axial load is transmitted from the first collar member 2 to the second collar member 3 through the first tube 1, by reaction, the second collar member 3 sandwiched with the differential device, which is not shown in the drawings and is fixed to the vehicle, is applied with an axial load from the second shaft part side, which is not shown in the drawings. Then, as shown in FIG. 5, the second main body part 31 of the second collar member 3 receiving the axial load enters into the inside of the second end portion 12 of the first tube 1, and moves to the front side (first tube 1 side) until the second joint member 5 comes in contact with the second end portion 12 of the first tube 1.

At this time, the second main body part 31 of which the maximum value of the outer diameter is set to be greater than the maximum value of the outer diameter of the second insertion part 32 and in which the second insertion-side connection portion 34 faces the second end surface 121 of the first tube 1 enters into the inside of the first tube 1, while peeling the inner peripheral layer 13 by the second insertion-side connection portion 34 and pushing and expanding the outer peripheral layer 14 radially outside. That is, the second main body part 31 enters into the inside of the first tube 1, while receiving resistance accompanying the peeling of the inner peripheral layer 13 by the second insertion-side connection portion 34.

In this way, both of the first main body part 21 and the second main body part 31 enter into the inside of the first tube 1, the axial load is buffered, and consequently, the collision energy of the vehicle is absorbed. In other words, by the normal entering of the first main body part 21 and the second main body part 31 into the inside of the first tube 1 together, the axial load is normally buffered, and thereby a failure such as the bending of the propeller shaft PS1 toward a vehicle body is suppressed.

Working Effect of the Present Embodiment

As mentioned above, in the conventional propeller shaft, the flange portions facing the respective first and second end portions 11 and 12 of the first tube that is a first shaft member are provided to the respective first and second main body parts of the first and second collar members. Consequently, there is a possibility that, at the time of the collision of a vehicle, in the both end portions 11 and 12 of the first tube, the first and second collar members cannot enter into the inside of the first tube due to the sticking of the first and second collar members by the flange portions, and the stroke amount of the first and second collar members cannot be sufficiently secured.

In contrast to this, in the propeller shaft PS1 according to the present embodiment, the following effect is exhibited, and thereby the problem of the conventional propeller shaft can be solved.

In the power transmission shaft provided between the first shaft part (not shown in the drawings) and the second shaft part (not shown in the drawings) that are a pair of vehicle-side rotation shaft parts, the propeller shaft PS1 includes: the first tube 1 as a first shaft member made of a carbon fiber reinforced plastic material and formed in a cylindrical shape; the first collar member 2 that is a first collar member including the first main body part 21 and the first insertion part 22, wherein the first insertion part 22 is inserted into the inside of the first tube 1 from a side of the first end portion 11 of the first and second end portions 11 and 12 that are a pair of end portions of the first tube 1 in the direction of an rotation axis Z of the first tube 1, and wherein the first main body part 21 is provided more on the opposite side of the first insertion part 22 than the first end portion 11 in the direction of the rotation axis Z of the first tube 1, and is formed such that, in the region A1 having a predetermined length from the first end portion 11 toward the opposite side of the first insertion part 22 in the direction of the rotation axis X of the first tube 1, the maximum value of the outer diameter of the first main body part 21 (the outer diameter D4 of the first insertion-side connection portion 24) that is a dimension in the radial direction with respect to the rotation axis Z of the first tube 1 is equal to or less than the maximum value of the outer diameter of the first insertion part 22 (the outer diameter D3 of the tooth tips 262 of the first serration portion 26); and the second collar member 3 that is a second collar member including the second main body part 31 and the second insertion part 32, wherein the second insertion part 32 is inserted into the inside of the first tube 1 from a side of the second end portion 12, and wherein the second main body part 31 is provided more on the opposite side of the second insertion part 32 than the second end portion 12 in the direction of the rotation axis Z of the first tube 1.

In this way, in the present embodiment, the maximum value of the outer diameter of the first main body part 21 in the first collar member 2 (the outer diameter D4 of the first insertion-side connection portion 24) is set to be equal to or less than the maximum value of the outer diameter of the first insertion part 22 (the outer diameter D3 of the tooth tips 262 of the first serration portion 26). Consequently, in case where the force in the compression direction is applied to the propeller shaft PS1 at the time of the collision of the vehicle, the first main body part 21 can smoothly enter into the inside of the first tube 1. As a result, the stroke amount of the first collar member 2 that is the relative movement amount of the first collar member 2 with respect to the first tube 1 can be sufficiently secured.

In particular, in the present embodiment, on at least the first end portion 11 side of the first tube 1, a proper stroke amount of the first collar member 2 can be secured, and thereby energy absorption can be excellently performed at the time of the collision of the vehicle.

In addition, the first collar member 2 smoothly enters into the inside of the first tube 1, and thereby the axial direction load received by the first collar member 2 is smoothly transmitted to the second collar member 3. Consequently, the entering of the second collar member 3 into the inside of the first tube 1 can be improved.

The propeller shaft PS1 according to the present embodiment includes the first joint member 4 and the second joint member 5, wherein the first joint member 4 is provided on the opposite side of the first tube 1 with respect to the first collar member 2 in the direction of the rotation axis Z of the first tube 1, and is formed such that the maximum value of the outer diameter D1 of the first joint member 4 that is a dimension in the radial direction with respect to the rotation axis Z of the first tube 1 is greater than the maximum value of the outer diameter of the first insertion part 22, wherein the second joint member 5 is provided on the opposite side of the first tube 1 with respect to the second collar member 3 in the direction of the rotation axis Z of the first tube 1, and is formed such that the maximum value of the outer diameter of the second joint member 5 that is a dimension in the radial direction with respect to the rotation axis Z of the first tube 1 is greater than the outer diameter of the second insertion part 32, wherein the second collar member 3 is equipped with the second insertion-side connection portion 34 that is a flange portion, and wherein the second insertion-side connection portion 34 is provided to the second main body part 31, and is formed so as to overlap with the second end surface 121 that is an end surface of the first tube 1 on a second end portion 12 side, in the radial direction with respect to the rotation axis Z of the first tube 1.

In this way, in the present embodiment, the first collar member 2 is a so-called flangeless member, and the second collar member 3 has a flange. Consequently, at the time of the collision of the vehicle, the second main body part 31 having the flange can be controlled so as to enter into the inside of the first tube 1 more smoothly by the smooth entering of the flangeless first main body part 21 into the inside of the first tube 1.

In other words, heretofore, since both the first and second collar members 2 and 3 each have had a flange, the stroke order of the first and second collar members 2 and 3 has been unknown, and a breaking mode of the first and second end portions 11 and 12 of the first tube 1 has been uncontrollable. Consequently, it has been one of the factors that the stroke amount of the first and second collar members 2 and 3 has become insufficient.

In contrast to this, the first end portion 11 side of the first tube 1 is formed to be flangeless, and the first end portion 11 side that is the flangeless side is broken first, following which the second end portion 12 side that is a side on which a flange is provided is broken. Accordingly, the stroke order of the first and second members 2 and 3 becomes clear, and the breaking mode of the first and second collar members 11 and 12 of the first tube 1 can be controlled.

In addition, in the present embodiment, the first collar member 2 is formed such that the distance L1 between the first end portion 11 and the first joint member 4 in the direction of the rotation axis Z of the first tube 1 is longer than the distance L2 between the second end portion 12 and the second joint member 5.

In this way, in the present embodiment, the distance L1 between the first joint member 4 and the first end portion 11 on the first collar member 2 side that is a flangeless side and which is capable of being broken more smoothly is secured so as to be longer than the distance L2 between the second joint member 5 and the second end portion 12. Consequently, the stroke amount at the time of the collision of the vehicle can be sufficiently secured.

In addition, in the present embodiment, the first insertion part 22 includes the first serration portion 26 that is a serration portion provided on the outer peripheral side of the first insertion part 22.

In this way, in the present embodiment, the first serration portion 26 is provided on the outer peripheral side of the first insertion part 22, and the tooth tips 262 of the first serration portion 26 bite into the inner peripheral side of the first tube 1. Therefore, when the first main body part 21 enters into the inside of the first tube 1, the first main body part 21 moves in the direction in which the tooth tips 262 of the first serration portion 26 extend. Consequently, the stroke amount of the first collar member 2 can be sufficiently secured, while suppressing a load (energy) required for the stroke of the first collar member 2.

In addition, in the present embodiment, the first serration portion 26 is provided such that the groove 261 of the first serration portion 26 extends in the direction parallel to the direction of the rotation axis Z of the first tube 1.

In this way, in the present embodiment, the groove 261 of the first serration portion 26 extends parallel to the axial direction. Therefore the first collar member 2 enters into the inside of the first tube 1 along the axial direction, and the axial load at the time of the collision of the vehicle can be directly transmitted along the axial direction. Consequently, the axial load can be sufficiently utilized as an energy for the stroke of the first collar member 2, and can be used for further smooth stroke of the first collar member 2.

In addition, in the present embodiment, the first collar member 2 is equipped with the balance weight W, and the first collar member 2 is formed such that the maximum value of the outer diameter of the first collar member 2 including the balance weight W is less than the inner diameter R1 of the first tube 1.

In this way, in the present embodiment, the maximum value of the outer diameter of the first collar member 2 including the balance weight W is set so as to be smaller than the inner diameter R1 of the first tube 1. Consequently, when the first main body part 21 enters into the inside of the first tube 1, the first main body part 21 including the balance weight W is prevented from being caught to the first tube 1, and the smooth stroke of the first collar member 2 can be carried out.

Second Embodiment

Figure 6:
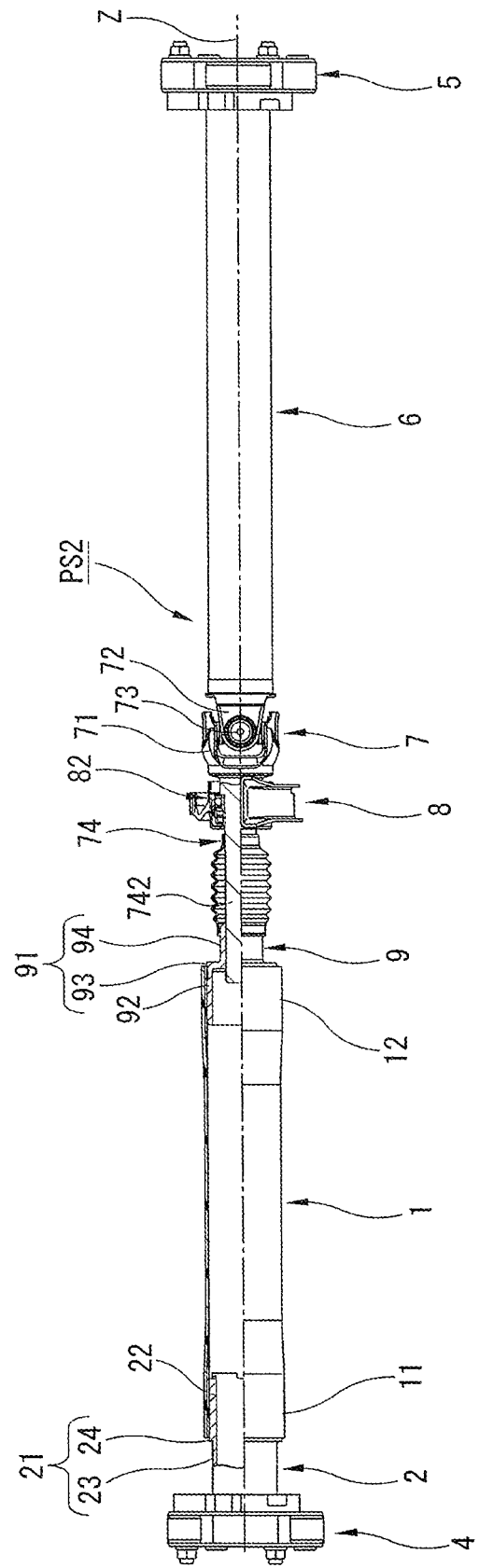
FIG. 6 is a semi-longitudinal section view, showing the whole of a power transmission shaft according to a second embodiment of the present invention.
Figure 7:
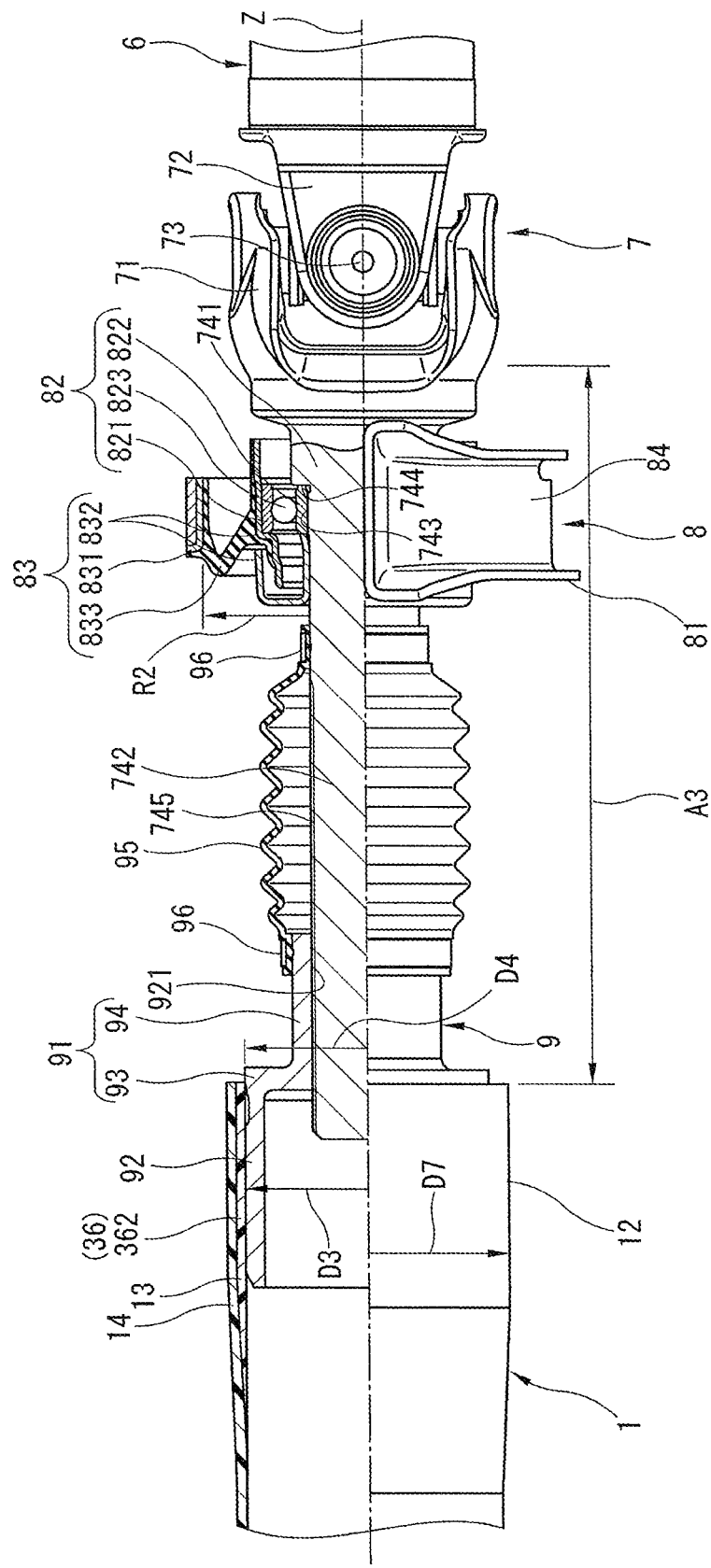
FIG. 7 is a semi-longitudinal section view of the power transmission shaft, showing an enlarged part in the vicinity of a second end portion of a first shaft member shown in FIG. 6.
Figure 8:
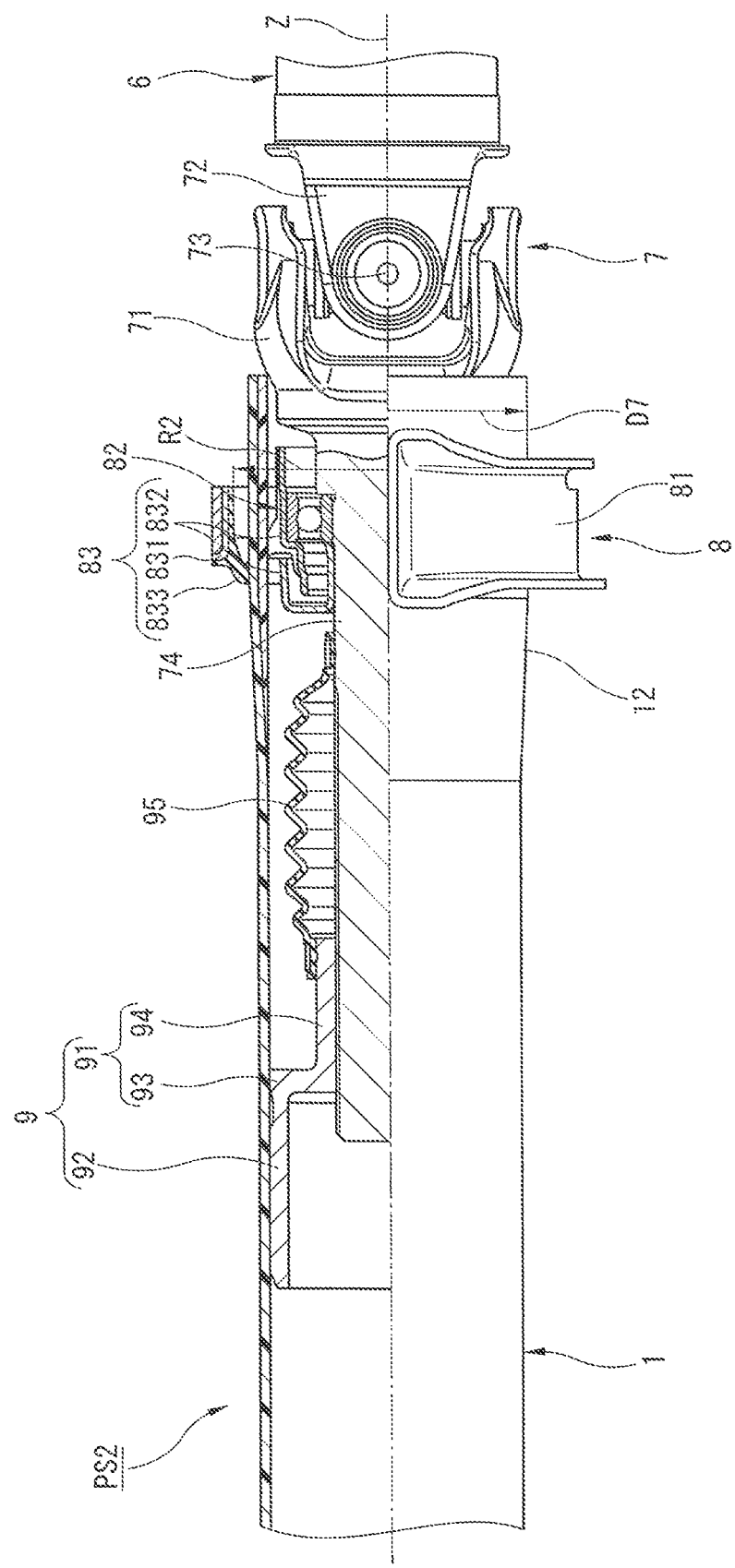
FIG. 8 is a semi-longitudinal section view of the power transmission shaft, showing a state in which an axial load is applied to a second collar member shown in FIG. 7.

FIG. 6 to FIG. 8 show a second embodiment of a power transmission shaft according to the present invention, and the second embodiment is one in which the propeller shaft PS1 according the first embodiment is configured by a two piece structure. In addition, since a basic structure thereof other than changes is the same as the first embodiment, the same symbols are applied to the same components as the first embodiment, and its explanation is omitted. In addition, in the explanation of the embodiment, for convenience, the left side in FIG. 6 is referred to as "front", the right side in FIG. 6 is referred to as "rear". Moreover, in the explanation, the direction along a rotation axis Z in FIG. 6 is referred to as "axial direction", the direction orthogonal to the rotation axis Z is referred to as "radial direction", and the direction around the rotation axis Z is referred to as "circumferential direction".

Configuration of Propeller Shaft

FIG. 6 is a side view of a propeller shaft PS2, showing the whole of the propeller shaft PS2 according to a second embodiment of the present invention.

As shown in FIG. 6, the propeller shaft PS2 includes a first tube 1 as a first shaft member which is connected to a first shaft part, which is not shown in the drawings, through a first joint member 4, and a second tube 6 as a second shaft member which is connected to a second shaft part, which is not shown in the drawings, through a second joint member 5. Then, the first tube 1 and the second tube 6 are integrally rotatably connected to each other through a third joint member 7, and are suspended on a vehicle, which is not shown in the drawings, through a vehicle body mounting bracket part 8 provided near the third joint member 7.

The third joint member 7 is a Cardan joint as a universal joint, and includes a first yoke 71 connected on the first tube 1 side, a second yoke 72 connected on the second tube 6 side, and a cross shaft 73 disposed between the first yoke 71 and the second yoke 72. The first yoke 71 is formed integrally with a connection shaft part 74 extending toward the front side (second collar member 9 side) along the axial direction, and is connected to the after-mentioned second collar member 9 through the connection shaft part 74.

FIG. 7 is an enlarged main part view of FIG. 6 which is shown by enlarging the vicinity of a second end portion 12 of the first tube 1 shown in FIG. 6.

As shown in FIG. 7, the connection shaft part 74 includes a yoke-side connection portion 741 formed at the rear end part thereof and connected to the first yoke 71 so as to be formed integrally with the first yoke 71, and a collar-side connection portion 742 formed at the front end part thereof and connected to the second collar member 9. Moreover, a bearing holding portion 743 for rotatably supporting a bearing 82 by holding an inner ring 822 of the bearing 82 is formed between the yoke-side connection portion 741 and the collar-side connection portion 742.

The yoke-side connection portion 741 is formed step-wisely by enlarging the diameter thereof with respect to the bearing holding portion 743, and a step portion 744 for determining the position in the axial direction of the after-mentioned inner ring 822 of the bearing 82 by the abutting of the inner ring 822 against the step portion 744 is formed between the yoke-side connection portion 741 and the bearing holding portion 743.

The collar-side connection portion 742 is formed such that the outer diameter thereof is slightly smaller than that of the bearing holding portion 743, and a male spline portion 745 spline-fitted to the second collar member 9 is formed on the outer peripheral side of the collar-side connection portion 742 along the axial direction. That is, the male spline potion 745 is fitted to the after-mentioned female spline portion 921 of the second collar member 9, and consequently, the collar-side connection portion 742 can be relatively moved in the axial direction with respect to the second collar member 9.

The vehicle body mounting bracket part 8 includes a bracket main body portion 81 provided on the outer peripheral side of the connection shaft part 74 so as to surround the connection shaft part 74, the bearing 82 disposed on the inner peripheral side of the bracket main body portion 81 and rotatably supporting the connection shaft part 74, and a buffer portion 83 disposed between the bearing 82 and the bracket main body portion 81 in the radial direction.

The bracket main body portion 81 is made of a metal material, is formed in an annular shape, and is fixed to the lower part of the floor of the vehicle, which is not shown in the drawings, by a bolt through a substantially U-shaped connection portion 84 provided on the lower side. In addition, an inner diameter R2 of the bracket main body portion 81 is set to be greater than an outer diameter D7 of the first tube 1.

The bearing 82 is a well-known ball bearing formed in an annular shape, and is disposed on the outer peripheral side of the connection shaft part 74 so as to surround the connection shaft part 74. Specifically, the bearing 82 includes an outer ring 821 held by the bracket main body portion 81, the inner ring 822 held by the bearing holding portion 743 of the connection shaft part 74, and a plurality of balls 823 as rolling elements interposed between the outer ring 821 and the inner ring 822.

The buffer portion 83 is made of an elastic material, such as a rubber material, is formed in an annular shape, and is provided to suppress the transmission of the vibration of the propeller shaft PS2, which is generated during the traveling of the vehicle, to the vehicle body by absorbing the vibration of the propeller shaft PS2. Specifically, the buffer portion 83 includes a metal outer-side annular member 831 held by the connection portion 84, a metal inner-side annular member 832 connected to the outer ring 821 of the bearing 82, and a rubber buffer member 833 interposed between the outer-side annular member 831 and the inner-side annular member 832 in the radial direction. At this time, the inner-side annular member 832 is formed in a so-called labyrinth like shape, and with this, the entering of foreign matters, such as dust and water, into the inside of the bearing 82 from the outside is suppressed.

The second collar member 9 includes a second main body part 91 exposed from the second end portion 12 of the first tube 1 and connected to the third joint member 7 (connection shaft part 74), and a second insertion part 92 extending from the front end portion of a second main body part 91 in the axial direction and inserted into the inside of the second end portion 12 of the first tube 1.

The second main body part 91 includes a joint-side connection portion 94 connected to the third joint member 7, and an insertion-side connection portion 93 of which the diameter is enlarged stepwisely from the front end portion of the joint-side connection portion 94 and which is connected to the second insertion part 92.

The joint-side connection portion $_{93}$ 94 has a cylindrical shape with a fixed outer diameter in the axial direction, and is formed with, on the inner peripheral side thereof, the female spline portion 921 along the axial direction, which is fitted to the male spline portion 745 of the connection shaft part 74, over the entire region in the axial direction of the joint-side connection portion 94. Based on the spline fitting, the second collar member 9 can be relatively moved in the axial direction with respect to the connection shaft part 74.

An outer diameter D4 of the insertion-side connection portion 93 is set so as to be the maximum value of the outer diameter of the second main body part 91. That is, in a region A3 having a predetermined length extending from the second end portion 12 of the first tube 1 toward the side opposite to the second insertion part 92 (specifically, a maximum axial region of the second main body part 91 which enters into the inside of the first tube 1), the maximum value of the outer diameter of the second main body part 91 is set so as to be equal to or less than the maximum value of the outer diameter of the second insertion part 92 which corresponds to an outer diameter D3 of tooth tips 362 of a second serration portion 36.

A bellows-like boots member 95 made of rubber which surrounds the male spline portion 745 is provided between the second collar member 9 and the connection shaft part 74 so as to extend from the second collar member 9 to the connection shaft part 74. That is, by the boots member 95, the adhesion of foreign matters, such as dust and water, to the male spline portion 745 from the outside is suppressed. The boots member 95 is fastened and fixed to the outer peripheral surfaces of the second collar member 9 and the connection shaft part 74 by ring-shaped boots bands 96.

Collapse Structure of Propeller Shaft

FIG. 8 shows a semi-longitudinal section view of the propeller shaft PS2, in a state in which an axial load is applied to the second collar member 9 shown in FIG. 7.

For example, when the axial load in a compression direction is applied from the front end side of the propeller shaft PS2 due the collision of the vehicle from the front side thereof, similar to the first embodiment, first, the first end portion 11 side of the first tube 1 is broken. That is, the first main body part 21 of the first collar member 2 enters into the inside of the first end portion 11 of the first tube 1, and moves to the rear side (first tube 1 side) until the first joint member 4 comes in contact with the first end portion 11 of the first tube 1 (see FIG. 4).

Next, when the axial load is transmitted from the first collar member 2 to the second collar member 9 through the first tube 1, by reaction, the second collar member 9 sandwiched with the second tube 6 connected to the differential device, which is not shown in the drawings and is fixed to the vehicle, is applied with an axial load from the second shaft part side, which is not shown in the drawings. Then, as shown in FIG. 8, the second main body part 91 of the second collar member 9 receiving the axial load enters into the inside of the second end portion 12 of the first tube 1, and moves to the front side (first tube 1 side) until the third joint member 7 comes in contact with the second end portion 12 of the first tube 1.

At this time, the second main body part 91 of which the maximum value of the outer diameter is set to be smaller than the maximum value of the outer diameter of the second insertion part 92 smoothly enters into the inside of the first tube 1 without interference with the second end portion 12 of the first tube 1. In other words, by the smooth entering of the second main body part 91 into the inside of the first tube 1, the axial load received by the second collar member 9 is smoothly transmitted to the rear side (second tube 6 side).

In addition, since the inner diameter R2 of the bracket main body portion 81 is set to be greater than the outer diameter D7 of the first tube 1, at the time of the performing of a stroke of the second collar member 9, the second end portion 12 of the first tube 1 performs a stroke so as to pass through the inner side of the bracket main body portion 81, while breaking the buffer portion 83 of the vehicle body mounting bracket part 8.

In this way, also in the present embodiment, both of the first main body part 21 and the second main body part 91 enter into the inside of the first tube 1, the axial load is buffered, and consequently, the collision energy of the vehicle is absorbed. In other words, by the normal entering of both of the first main body part 21 and the second main body part 91 into the inside of the first tube 1, the axial load is normally buffered, and thereby a failure such as the bending of the propeller shaft PS2 toward a vehicle body is suppressed.

Working Effect of the Present Embodiment

The propeller shaft PS2 according to the present embodiment is especially further equipped with the second tube 6 as a second shaft member, and the second tube 6 is made of a metal material and is provided between the second collar member 9 and the second shaft part, which is not shown in the drawings, in the direction of the rotation axis Z of the second tube 6.

In this way, in the present embodiment, the propeller shaft PS2 is divided into two parts of the first tube 1 and the second tube 6, and the second tube 6 is made of a metal material different from the first tube 1 which is made of carbon fiber reinforced plastic. Consequently, by the difference in specific gravity between the first tube 1 and the second tube 6, the resonance frequency of the first tube 1 can be shifted from that of the second tube 6, and thereby the occurrence of the vibration accompanying the rotation of the propeller shaft PS2 can be suppressed.

In addition, the propeller shaft PS2 according to the present embodiment further includes the third joint member 7 that is a universal joint and the vehicle body mounting bracket part 8, wherein the third joint member 7 is provided between the second collar member 9 and the second tube 6 in the direction of the rotation axis Z of the second tube 6, and wherein the vehicle body mounting bracket part 8 is provided between the second collar member 9 and the third joint member 7 in the direction of the rotation axis Z of the first tube 1.

In the second tube 6 on a side provided with the third joint member 7 to the vehicle body mounting bracket part 8, there is possibility that the second collar member 9 does not perform a straight stroke due to the influence on the third joint member 7, such as the bending of the third joint member 7, at the time of the collision of the vehicle body. Therefore, by arranging the second collar member 9 on the first tube 1 side which relatively performs a straight stroke to secure a stroke amount on the first tube 1 side, a collision energy can be efficiently converted to the stroke amount, and thereby a sufficient stroke amount can be secured.

In addition, in the present embodiment, the third joint member 7 is equipped with the connection shaft part 74, the connection shaft part 74 extends toward the second collar member 9 in the direction of the rotation axis Z of the first tube 1 so as to be connected to the second collar member 9, the vehicle body mounting bracket part 8 is equipped with the bearing 82, the bracket main body portion 81 and the buffer portion 83, the bearing 82 is formed in an annular shape so as to surround the connection shaft part 74, the bracket main body portion 81 is formed in an annular shape, is made of a metal material, is provided so as to surround the bearing 82, is equipped with the connection portion 84 connected to the vehicle, and is formed such that the inner diameter R2 of the bracket main body portion 81 that is a dimension in the radial direction with respect to the rotation axis Z of the first tube 1 is greater than the outer diameter D7 of the first tube 1, and the buffer portion 83 is formed in an annular shape, is made of an elastic material, and is provided between the bearing 82 and the bracket main body portion 81 in the radial direction with respect to the rotation axis Z of the first tube 1.

According to the above configuration, in the present embodiment, at the time of the collision of the vehicle, the first tube 1 can perform a stroke so as to pass through the inner side of the bracket main body portion 81 by breaking the buffer portion 83 of the vehicle body mounting bracket part 8. With this, a larger stroke amount can be secured.

In addition, in the present embodiment, in the region A3 having a predetermined length from the second end portion 12 toward the opposite side of the second insertion part 92 in the direction of the rotation axis (Z) of the first tube 1, the second main body part 91 of the second collar member 9 is formed such that the maximum value of the outer diameter of the second main body part 91 that is a dimension in the radial direction with respect to the rotation axis Z of the first tube 1 is equal to or less than the maximum value of the outer diameter of the second insertion part 92.

In this way, in the present embodiment, in addition to the first collar member 2 side, the second collar member 9 side is also formed to be so-called flangeless, and consequently, a larger stroke amount can be secured.

The present invention is not limited to the configurations and modes shown in the embodiments, and can be freely modified according to the specification and the cost of an object to be applied, as long as being a form with which the above-mentioned working effects of the present invention can be obtained.

For example, in the embodiments, as an example, although the first shaft part, which is not shown in the drawings, is set as the output shaft of the transmission of the vehicle and the second shaft part, which is not shown in the drawings, is set as the input shaft of the differential device of the vehicle, they may be reversed.

In addition, in case of a vehicle in which the transmission is provided on a drive wheel (rear wheel) side, the first shaft part may be the output shaft of the engine and the second shaft part may be the input shaft of the transmission, or they may be reversed.

Moreover, the present invention can be also applied to a vehicle in which an electric motor is used as a continuously speed reducing transmission instead of the transmission.

In addition, although, as an example, one has been shown in which the maximum value of the outer diameter of the first collar member 2, namely, the outer diameter D3 of the tooth tips 262 of the first serration portion 26 is set to be greater than the inner diameter R1 of the first tube 1, the present invention is not limited to this configuration. In other words, the first collar member 2 may be formed such that the maximum value of the outer diameter of the first collar member 2 that is a dimension in the radial direction with respect to the rotation axis Z of the first tube 1 becomes smaller than the inner diameter R1 of the first tube 1. Specifically, the outer diameter D3 of the tooth tips 262 of the first serration portion 26 is set to be smaller than the inner diameter R1 of the first tube 1, and by interposing adhesive between the first serration portion 26 and the first tube 1 in the radial direction, the first collar member 2 and the first tube 1 can be integrally rotatably fixed to each other.

In this case, since the tooth tips 262 of the first serration portion 26 do not interfere with the inner peripheral surface of the first tube 1, the first collar member 2 is prevented from being caught to the first tube 1 at the time when the first main body part 21 enters into the inside of the first tube 1, and further smooth stroke of the first collar member 2 can be performed.

As a power transmission shaft based on the embodiments explained above, for example, the following aspects can be considered.

That is, according to one aspect of a power transmission shaft provided between a first shaft part and a second shaft part that are a pair of vehicle-side rotation shaft parts, the power transmission shaft includes a first shaft member made of a carbon fiber reinforced plastic material and formed in a cylindrical shape. The power transmission shaft further includes a first collar member including a first main body part and a first insertion part. The first insertion part is inserted into an inside of the first shaft member from a side of a first end portion of first and second end portions that are a pair of end portions of the first shaft member in a direction of an rotation axis of the first shaft member. The first main body part is provided more on an opposite side of the first insertion part than the first end portion in the direction of the rotation axis of the first shaft member. The first main body part is formed such that, in a region having a predetermined length from the first end portion toward an opposite side of the first insertion part in the direction of the rotation axis of the first shaft member, a maximum value of an outer diameter of the first main body part that is a dimension in a radial direction with respect to the rotation axis of the first shaft member is equal to or less than a maximum value of an outer diameter of the first insertion part. The power transmission shaft further includes a second collar member that is a second collar member including a second main body part and a second insertion part. The second insertion part is inserted into the inside of the first shaft member from a side of the second end portion. The second main body part is provided more on an opposite side of the second insertion part than the second end portion in the direction of the rotation axis of the first shaft member.

In another preferable aspect of the transmission shaft, the power transmission shaft includes a first joint member and a second joint member. The first joint member is provided on an opposite side of the first shaft member with respect to the first collar member in the direction of the rotation axis of the first shaft member. The first joint member is formed such that a maximum value of an outer diameter of the first joint member that is a dimension in the radial direction with respect to the rotation axis of the first shaft member is greater than the maximum value of the outer diameter of the first insertion part. The second joint member is provided on an opposite side of the first shaft member with respect to the second collar member in the direction of the rotation axis of the first shaft member, and is formed such that a maximum value of an outer diameter of the second joint member that is a dimension in the radial direction with respect to the rotation axis of the first shaft member is greater than an outer diameter of the second insertion part. The second collar member is equipped with a flange portion. The flange portion is provided to the second main body part. The flange portion is formed so as to overlap with a second end surface that is an end surface of the first shaft member on a second end portion side in the radial direction with respect to the rotation axis of the first shaft member.

In another preferable aspect, in any of aspects of the power transmission shaft, the first collar member is formed as follows. In the direction of the rotation axis of the first shaft member, a distance between the first end portion and the first joint member is longer than a distance between the second end portion and the second joint member.

In another further preferable aspect, in any of aspects of the power transmission shaft, the first insertion part includes a serration portion. The serration portion is provided on an outer peripheral side of the first insertion part.

In another further preferable aspect, in any of aspects of the power transmission shaft, the serration portion is provided such that a groove of the serration portion extends in a direction parallel to the direction of the rotation axis of the first shaft member.

In another further preferable aspect, in any of aspects of the power transmission shaft, the power transmission shaft further includes a second shaft member. The second shaft member is made of a metal material and is provided between the second collar member and the second shaft part in the direction of the rotation axis of the first shaft member.

In another further preferable aspect, in any of aspects of the power transmission shaft, the power transmission shaft further includes a universal joint and a vehicle body mounting bracket part. The universal joint is provided between the second collar member and the second shaft member in the direction of the rotation axis of the first shaft member. The vehicle body mounting bracket part is provided between the second collar member and the universal joint in the direction of the rotation axis of the first shaft member.

In another further preferable aspect, in any of aspects of the power transmission shaft, the universal joint is equipped with a connection shaft part. The connection shaft part extends toward the second collar member in the direction of the rotation axis of the first shaft member so as to be connected to the second collar member. The vehicle body mounting bracket part is equipped with a bearing, a bracket main body portion and a buffer portion. The bearing is formed in an annular shape so as to surround the connection shaft part. The bracket main body portion is formed in an annular shape, is made of a metal material, is provided so as to surround the bearing, is equipped with a connection portion connected to the vehicle, and is formed such that an inner diameter of the bracket main body portion that is a dimension in the radial direction with respect to the rotation axis of the first shaft member is greater than an outer diameter of the first shaft member. The buffer portion is formed in an annular shape, is made of an elastic material, and is provided between the bearing and the bracket main body portion in the radial direction with respect to the rotation axis of the first shaft member.

In another further preferable aspect, in any of aspects of the power transmission shaft, the first collar member is formed as follows. In particular, a maximum value of an outer diameter of the first collar member, which is a dimension in the radial direction with respect to the rotation axis of the first shaft member, is less than an inner diameter of the first shaft member.

In another further preferable aspect, in any of aspects of the power transmission shaft, the first collar member is equipped with a balance weight. The first collar member is formed such that a maximum value of an outer diameter of the first collar member including the balance weight is less than the inner diameter of the first shaft member.

In another further preferable aspect, in any of aspects of the power transmission shaft, in a region having a predetermined length from the second end portion toward an opposite side of the second insertion part in the direction of the rotation axis of the first shaft member, the second main body part of the second collar member is formed as follows. In particular, a maximum value of an outer diameter of the second main body part that is a dimension in the radial direction with respect to the rotation axis of the first shaft member is equal to or less than a maximum value of an outer diameter of the second insertion part.

The invention claimed is:

1. A power transmission shaft provided between a first shaft part and a second shaft part that are a pair of vehicle-side rotation shaft parts, comprising:
   a first shaft member made of a carbon fiber reinforced plastic material and formed in a cylindrical shape;
   a first collar member including a first main body part and a first insertion part; and
   a second collar member including a second main body part and a second insertion part,
   wherein the first insertion part is inserted into an inside of the first shaft member from a side of a first end portion of first and second end portions that are a pair of end portions of the first shaft member in a direction of an rotation axis of the first shaft member,
   wherein the first main body part is provided more on an opposite side of the first insertion part than the first end portion in the direction of the rotation axis of the first shaft member, and is formed such that, in a region having a predetermined length from the first end portion toward an opposite side of the first insertion part in the direction of the rotation axis of the first shaft member, a maximum value of an outer diameter of the first main body part that is a dimension in a radial direction with respect to the rotation axis of the first shaft member is equal to or less than a maximum value of an outer diameter of the first insertion part,
   wherein the second insertion part is inserted into the inside of the first shaft member from a side of the second end portion,
   wherein the second main body part is provided more on an opposite side of the second insertion part than the second end portion in the direction of the rotation axis of the first shaft member,
   wherein the power transmission shalt further comprises a first joint member and a second joint member,
   wherein the first joint member is provided on an opposite side of the first shaft member with respect to the first collar member in the direction of the rotation axis of the first shaft member, and is formed such that a maximum value of an outer diameter of the first joint member that is a dimension in the radial direction with respect to the rotation axis of the first shaft member is greater than the maximum value of the outer diameter of the first insertion part,
   wherein the second joint member is provided on an opposite side of the first shaft member with respect to the second collar member in the direction of the rotation axis of the first shaft member, and is formed such that a maximum value of an outer diameter of the second joint member that is a dimension in the radial direction with respect to the rotation axis of the first shaft member is greater than an outer diameter of the second insertion part,
   wherein the second collar member is equipped with a flange portion,
   wherein the flange portion is provided to the second main body part, and is formed so as to overlap with a second end surface that is an end surface of the first shaft member on a second end portion side, in the radial direction with respect to the rotation axis of the first shaft member, and
   wherein the first collar member is formed such that, in the direction of the rotation axis of the first shaft member, a distance between the first end portion and the first joint member is longer than a distance between the second end portion and the second joint member.

2. The power transmission shaft according to claim 1, wherein the first insertion part includes a serration portion provided on an outer peripheral side of the first insertion part.

3. The power transmission shaft according to claim 2, wherein the serration portion is provided such that a groove of the serration portion extends in a direction parallel to the direction of the rotation axis of the first shaft member.

4. The power transmission shaft according to claim 1, wherein the first collar member is formed such that a maximum value of an outer diameter of the first collar member that is a dimension in the radial direction with respect to the rotation axis of the first shaft member is less than an inner diameter of the first shaft member.

5. The power transmission shaft according to claim 4, wherein the first collar member is equipped with a balance weight, and
   wherein the first collar member is formed such that a maximum value of an outer diameter of the first collar member including the balance weight is less than the inner diameter of the first shaft member.

6. A power transmission shaft provided between a first shaft part and a second shaft part that are a pair of vehicle-side rotation shaft parts, comprising:
   a first shaft member made of a carbon fiber reinforced plastic material and formed in a cylindrical shape;
   a first collar member including a first main body part and a first insertion part; and
   a second collar member including a second main body part and a second insertion part,
   wherein the first insertion part is inserted into an inside of the first shaft member from a side of a first end portion of first and second end portions that are a pair of end portions of the first shaft member in a direction of an rotation axis of the first shaft member,
   wherein the first main body part is provided more on an opposite side of the first insertion part than the first end portion in the direction of the rotation axis of the first shaft member, and is formed such that, in a region having a predetermined length from the first end portion toward an opposite side of the first insertion part in the direction of the rotation axis of the first shaft member, a maximum value of an outer diameter of the first main body part that is a dimension in a radial direction with respect to the rotation axis of the first shaft member is equal to or less than a maximum value of an outer diameter of the first insertion part,
   wherein the second insertion part is inserted into the inside of the first shaft member from a side of the second end portion, wherein the second main body part is provided more on an opposite side of the second insertion part than the second end portion in the direction of the rotation axis of the first shaft member, wherein the power transmission shaft further comprises a second shaft member, wherein the second shaft member is made of a metal material and is provided between the second collar member and the second shaft part in the direction of the rotation axis of the first shaft member, wherein the power transmission shaft further comprises a universal joint and a vehicle body mounting bracket part, wherein the universal joint is provided between the second collar member and the second shaft member in the direction of the rotation axis of first shaft member, and wherein the vehicle body mounting bracket part is provided between the second collar member and the universal joint in the direction of the rotation axis of the first shaft member.

7. The power transmission shaft according to claim 6, wherein the universal joint is equipped with a connection shaft part, wherein the connection shaft part extends toward the second collar member in the direction of the rotation axis of the first shaft member so as to be connected to the second collar member, wherein the vehicle body mounting bracket part is equipped with a bearing, a bracket main body portion and a buffer portion, wherein the bearing is formed in an annular shape so as to surround the connection shaft part, wherein the bracket main body portion is formed in an annular shape, is made of a metal material, is provided so as to surround the bearing, is equipped with a connection portion connected to the vehicle, and is formed such that an inner diameter of the bracket main body portion that is a dimension in the radial direction with respect to the rotation axis of the first shaft member is greater than an outer diameter of the first shaft member, and wherein the buffer portion is formed in an annular shape, is made of an elastic material, and is provided between the bearing and the bracket main body portion in the radial direction with respect to the rotation axis of the first shaft member.

8. The power transmission shaft according to claim 6, wherein the first insertion part includes a serration portion provided on an outer peripheral side of the first insertion part.

9. The power transmission shaft according to claim 8, wherein the serration portion is provided such that a groove of the serration portion extends in a direction parallel to the direction of the rotation axis of the first shaft member.

10. A power transmission shaft provided between a first shaft part and a second shaft part that are a pair of vehicle-side rotation shaft parts, comprising:

a first shaft member made of a carbon fiber reinforced plastic material and formed in a cylindrical shape;

a first collar member including a first main body part and a first insertion part; and a second collar member including a second main body part and a second insertion part, wherein the first insertion part is inserted into an inside of the first shaft member from a side of a first end portion of first and second end portions that are a pair of end portions of the first shaft member in a direction of an rotation axis of the first shaft member, wherein the first main body part is provided more on an opposite side of the first insertion part than the first end portion in the direction of the rotation axis of the first shaft member, and is formed such that, in a region having a predetermined length from the first end portion toward an opposite side of the first insertion part in the direction of the rotation axis of the first shaft member, a maximum value of an outer diameter of the first main body part that is a dimension in a radial direction with respect to the rotation axis of the first shaft member is equal to or less than a maximum value of an outer diameter of the first insertion part, wherein the second insertion part is inserted into the inside of the first shaft member from a side of the second end portion, wherein the second main body part is provided more on an opposite side of the second insertion part than the second end portion in the direction of the rotation axis of the first shaft member, wherein the first collar member is formed such that a maximum value of an outer diameter of the first collar member that is a dimension in die radial direction with respect to the rotation axis of the first shaft member is less than an inner diameter of the first shaft member, wherein the first collar member is equipped with a balance weight, and wherein the first collar member is formed such that a maximum value of an outer diameter of the first collar member including the balance weight is less than the inner diameter of the first shaft member.

11. The power transmission shaft according to claim 10, wherein in a region having a predetermined length from the second end portion toward an opposite side of the second insertion part in the direction of the rotation axis of the first shaft member, the second main body part of the second collar member is formed such that a maximum value of an outer diameter of the second main body part that is a dimension in the radial direction with respect to the rotation axis of the first shaft member is equal to or less than a maximum value of an outer diameter of the second insertion part.

12. The power transmission shaft according to claim 10, wherein the first insertion part includes a serration portion provided on an outer peripheral side of the first insertion part.

13. The power transmission shaft according to claim 12, wherein the serration portion is provided such that a groove of the serration portion extends in a direction parallel to the direction of the rotation axis of the first shaft member.

* * * * *